United States Patent [19]

Nimberger

[11] Patent Number: 4,630,629
[45] Date of Patent: Dec. 23, 1986

[54] VALVE WITH COMPRESSIBLE VALVE STEM AND VALVE BODY SEALS

[75] Inventor: Spencer M. Nimberger, Houston, Tex.

[73] Assignee: General Screw Products Company, Houston, Tex.

[21] Appl. No.: 837,387

[22] Filed: Mar. 7, 1986

[51] Int. Cl.⁴ ............................ F16K 41/00; F16K 51/00
[52] U.S. Cl. ........................................ 137/15; 251/214; 251/223; 251/225; 277/112
[58] Field of Search .............. 251/122, 214, 221, 223, 251/225; 277/112, 188 A, 188 R; 137/15, 315

[56] References Cited

U.S. PATENT DOCUMENTS

| | | |
|---|---|---|
| 669,476 | 3/1901 | Bullard ............................ 251/143 |
| 1,070,453 | 8/1913 | Griffin et al. ................... 251/223 |
| 1,723,978 | 8/1929 | Welch et al. .................... 251/223 |
| 2,497,354 | 2/1950 | Hackathorn ..................... 251/223 |
| 2,765,185 | 10/1956 | Mott ............................... 251/214 |
| 2,904,071 | 9/1959 | Stein ............................... 137/596 |
| 3,197,215 | 7/1965 | Hodge ............................. 277/64 |
| 3,240,230 | 3/1966 | Callahan, Jr. et al. .......... 251/214 |
| 3,323,805 | 6/1967 | Legarra ........................... 277/112 |
| 3,348,570 | 10/1967 | Nealy .............................. 251/214 |
| 3,443,789 | 5/1969 | Glasgow et al. ................ 251/214 |
| 3,467,357 | 9/1969 | Schomer et al. ................ 251/214 |
| 3,529,805 | 9/1970 | Callahan, Jr. et al. .......... 251/214 |
| 3,851,853 | 12/1974 | Teeters ........................... 251/214 |
| 3,910,553 | 10/1975 | Boylan ............................ 251/214 |
| 4,061,157 | 12/1977 | Hanssen .......................... 251/214 |
| 4,114,851 | 9/1978 | Shivak ............................ 251/214 |
| 4,134,420 | 1/1979 | Okonowitz ..................... 251/223 |
| 4,149,699 | 4/1979 | Speckman ....................... 251/214 |
| 4,323,003 | 4/1982 | Clippard, III ................... 277/112 |
| 4,399,834 | 8/1983 | Baumann ........................ 251/214 |
| 4,426,093 | 1/1984 | Roush .............................. 251/214 |
| 4,431,021 | 2/1984 | Scaramucci ..................... 251/223 |
| 4,444,220 | 4/1984 | Seger .............................. 251/214 |
| 4,556,196 | 12/1985 | Nimberger ...................... 251/214 |

OTHER PUBLICATIONS

Brochure entitled "Industrial Valves & Manifolds", Catalog No. 0485 by General Screw Products Co.
Catalog pages entitled "Section B—Non–Rotating Stem Valves" by Autoclave Engineers (not dated but admittedly prior art).

Primary Examiner—George L. Walton
Attorney, Agent, or Firm—Norvell & Associates

[57] ABSTRACT

A valve is provided with improved bonnet-stem and bonnet-valve body seals. Both non-metallic seals may be simultaneously compressed by threading the bonnet to the valve body, with a valve stem seal sandwiched between the bonnet and an axially movale retainer in engagement with the valve body. A jam nut threaded to the exterior of the bonnet may be periodically loosened, and the bonnet further threaded to the valve body to re-compress both seals and stop leakage from the valve. The concepts of the present invention are well adapted to providing a low cost valve suitable for handling corrosive fluids.

20 Claims, 3 Drawing Figures

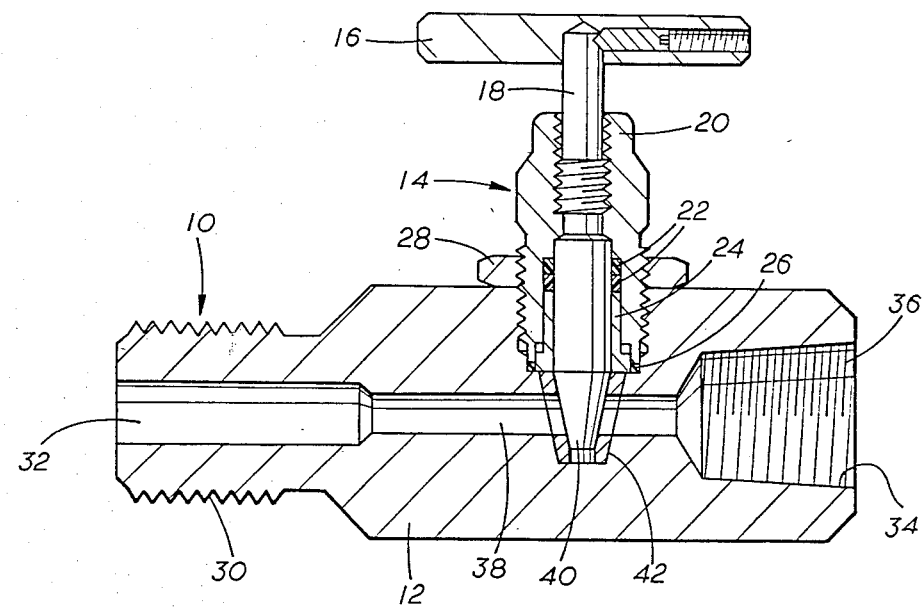
FIG.1
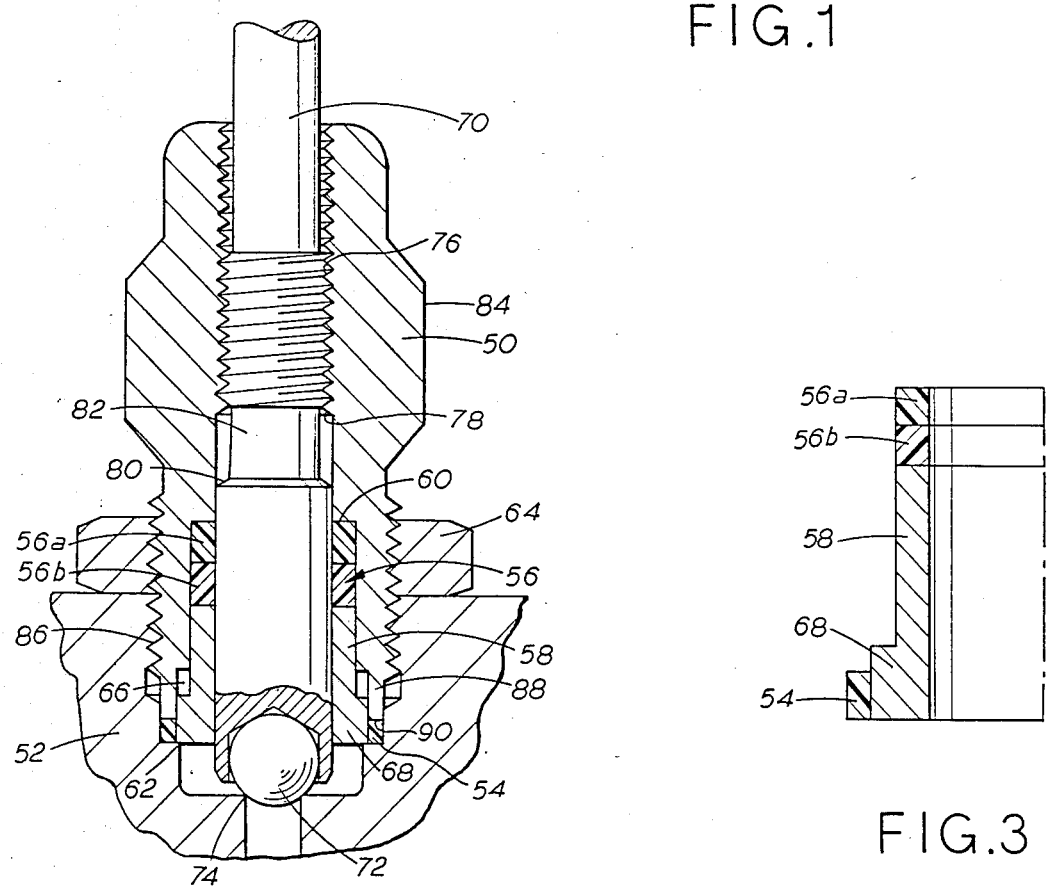
FIG.2
FIG.3

VALVE WITH COMPRESSIBLE VALVE STEM AND VALVE BODY SEALS

BACKGROUND OF THE INVENTION

The present invention concerns valves of the type having a rotatable valve stem passing through a bonnet and having a sealing surface for engagement and disengagement with a valve seat in the valve body. Such valves are commonly used in many industries, and one such type of valve referred to as a gauge valve is illustrated in several embodiments in a brochure entitled "INDUSTRIAL VALVES AND MANIFOLDS" distributed by General Screw Products Company. Many such valves are provided with a bonnet threaded to the valve body and adapted for receiving a rotatable and axially movable valve stem, and for convenience in description are the type of valve generally referred to below.

More particularly, the present invention concerns the seals which prevent the escape of pressurized fluid from the valve body. A first seal is provided between the valve stem and the bonnet, and a second seal is provided between the valve body and the bonnet. In many prior art embodiments, this latter seal is a metal-to-metal seal formed between the end of the bonnet and the valve body, as shown, for example, in U.S. Pat. No. 4,556,196. Among other reaons, a valve with metal-to-metal seals between the bonnet and the valve body is not generally preferred for handling highly corrosive fluids. A pin hole leak past the metal-to-metal seal cannot be easily repaired, and often such a leak results in the economic loss of an entire valve.

It is well known in the art to provide an arrangement whereby the valve stem seal may be periodically further compressed. With time, such seals generally tend to lose their sealing effectiveness, and further compression of the seal can often stop fluid leakage around the valve stem. One illustration of a compressible valve stem seal is shown in U.S. Pat. No. 3,529,805.

Pliable seals between the valve stem and the bonnet, and between the bonnet and the body, are shown in U.S. Pat. No. 3,401,357. The valve body-bonnet seal arrangement described therein has not, however, been widely accepted in the industry, and compression of the valve stem seal cannot be easily accomplished. A valve body-extension member seal is disclosed in U.S. Pat. No. 3,910,553, but compression of the valve stem seal is not provided.

It is also known in the art to provide a compressible seal between a valve body and a valve stem, along with means for further compressing the seal during maintenance operations. Such a valve, however, has significant disadvantages over a valve of the type employing a valve stem seal between the bonnet and the valve stem. First, a valve of the latter type can generally be made with fewer and/or less expensive components. Second, a valve of the latter type can be easily manufactured with fireproof metal-to-metal seals for preventing fluid loss past the valve stem when the valve is in the fully open position —even if the valve stem seal is destroyed.

The disadvantages of the prior art overcome by the present invention, in improved methods and apparatus are hereinafter provided for effectively sealing fluid within a valve body.

SUMMARY OF THE INVENTION

A valve is provided with a compressible valve stem seal between the valve sealing surface and a threaded portion of the valve stem. The valve stem seal engages the bonnet, which is threaded to the valve body, and a second compressible seal is provided between the bonnet and the valve body. As the bonnet is threaded to the valve body, the end of the bonnet compresses the second seal and simultaneously forces an axially movable retainer upward to compress the valve stem seal against the bonnet.

The bonnet of the present invention is adapted for fitting within a standard threaded pocket of a valve body, and a standard valve stem may also be utilized in the valve of the present invention, thus reducing manufacturing costs and repair/replacement parts. Only the outer edge of the axially movable retainer engages the valve body pocket, so that the thickness of the bonnet-valve body seal is maximized.

According to the method of the present invention, a jam nut threaded to the bonnet may be loosened from the valve body should a leak occur. The bonnet may then be further threaded into the valve body pocket, further compressing the valve stem seal and the bonnet-valve body seal. The jam nut may then be re-tightened with the re-compressed seals again sealing fluid within the valve.

Accordingly, it is a feature of the present invention to provide an improved valve with both a valve stem seal and a bonnet-valve body seal, with the valve stem seal axially positioned between the valve stem threads and the sealing surface on the valve stem.

It is another feature of the present invention to provide a valve body with compressible seals between the valve stem and the bonnet and between the bonnet and the valve body, wherein the seals may be easily compressed during maintenance operations to inhibit leakage from the valve.

It is a further feature of the present invention to provide a valve assembly with a pliable valve stem seal and a pliable bonnet-valve body seal which may utilize a standard valve stem and a standard pocket in a standard valve body.

It is another feature of the present invention to provide an improved valve assembly capable of providing a desired sealing function for a wide variety of fluids passing through the valve body over a wide range of temperatures and pressures.

It is a further feature of the present invention to provide an improved valve assembly with packable seals between the valve stem and the bonnet and between the bonnet and the valve body, wherein the components of the valve assembly are relatively inexpensive to manufacture and install.

It is also a feature of the present invention to provide improved methods for manufacturing and servicing a valve assembly, wherein both the valve stem seal and the bonnet-valve body seal may be simultaneously compressed by further threading the bonnet to the valve body.

These and other features and advantages of the present invention will become apparent from the following detailed description, wherein reference is made to the Figures in the accompanying drawings.

BRIEF DESCRIPTION OF THE DRAWINGS

FIG. 1 is a side view, partially in cross-section, of a typical valve according to the present invention with both valve stem seal and a bonnet-valve body seal.

FIG. 2 is an exploded pictorial view, partially in cross-section, of an alternate embodiment of a portion of the assembly shown in FIG. 1.

FIG. 3 is a cross-sectional view of the seals and retainer shown in FIG. 2.

DETAILED DESCRIPTION OF THE INVENTION

There is depicted in FIG. 1 a typical valve 10 including a valve stem seal and a bonnet-valve body seal according to the present invention. The valve 10 comprises a valve body 12 and a valve stem sub-assembly 14. The valve body comprises a fluid passageway 38 having a fluid inlet 32 and a fluid outlet 36. Typically, the ends of the valve body are threaded at 30 and 34 for receiving corresponding threads of pipe sections. A portion of a fluid passageway 38 includes a valve seating surface 42 for engagement with the valve stem sealing surface 40 to open or close the valve to fluid flow. The valve stem sub-assembly 14 comprises a bonnet 20 which is threaded to the valve body 12, a rotatable valve stem 18, and a handle 16 for rotating the valve stem. Valve stem 18 is threaded to the bonnet, so that rotation of the valve stem also causes movement along the axis of the valve stem. A first packable seal 22 is provided for sealing between the bonnet 20 and the valve stem 18. This seal is compressible by an axially movable retainer 24 described subsequently. A second compressible seal 26 is provided for sealing between the end of the bonnet 20 and the valve body 12. A jam nut 28 is provided for threading to the exterior of the bonnet, and prevents inadvertent rotation of the bonnet relative to the valve body.

The valve 10 shown in FIG. 1 is depicted for representative purposes, since the subject of the present invention may be used in many types of valves. In particular, however, the present invention is well adapted to a valve assembly of a type including a bonnet threaded to a valve body, with a valve stem seal positioned between the bonnet and the valve stem, and with the valve stem seal being axially positioned between the threads on the valve stem and the sealing surface of the valve stem.

As shown in FIGS. 1 and 2, the valve according to the present invention may have a valve stem with a conical-shaped seating surface or a spherical seating surface, with the seating surfaces of the valve stem engaging an appropriate metallic (hard) or pliable (soft) seating surface in the valve body. As illustrated in the Figures, the valve of the present invention includes a first compressible valve stem seal between the valve bonnet and the valve stem, and a second compressible seal between the bonnet and the body of the valve.

Referring now to FIG. 2, an alternate embodiment of a portion of the valve assembly shown in FIG. 1 is depicted. The valve stem 70 is of the type employing a spherical ball 72 for sealing with seat 74 of the valve body 52. Bonnet 50 includes threads 86 for threading to a threaded pocket mounted in the valve body and, for that purpose, an outer surface 84 of the bonnet may be hexagonally-shaped to receive a standard tool. The end 88 of the bonnet is provided with a circular surface 90 perpendicular to the axis of the stem for engagement with compressible seal 54. Further rotation of the bonnet 50 relative to the valve body thus further compresses seal 54 sandwiched between the surface 90 and shelf surface 62 of the valve stem pocket.

A second seal 56, preferably in two sections 56A and 56B, is provided for sealing between the valve stem and the bonnet. Seal 56 is compressed by axial movement of retainer 58 relative to the bonnet. As the bonnet 50 is further threaded to the valve body, surface 60 moves downward toward the retainer 56, thus compressing the seal 56. Retainer 58 includes an expanded diameter portion 68, and only the outer circumference of portion 68 preferably engages the portion of shelf 62 adjacent the internal diameter of 62, thereby maximizing the thickness of seal 54. The gap 66 shown in FIG. 2 between the bonnet and the retainer enables the bonnet to move axially relative to the retainer, and the axial length of gap 66 preferably is substantially equal to or greater than the axial height of seal 54 when first installed in the valve body. Threads 76 are provided between the valve stem and bonnet, and reduced diameter portion 82 enables conical surface 80 of the valve stem to engage corresponding surface 78 on the bonnet when the valve is in the fully open position.

With the exception of expanded portion 68, the outer diameter of retainer 58 is only slightly smaller than the internal diameter of the bonnet adjacent thereto, and the internal diameter of retainer 58 is only slightly greater than the outer diameter of the stem. Sealing engagement between the retainer and valve stem is not provided, and the retainer may move axially relative to the bonnet as described herein. The outer diameter of portion 68 is slightly less than the internal diameter of end portion 88, and the threads 86 terminate above surface 90. The cross-sectioned thickness at seal 54 is thus approximately equal to the cross-sectioned thickness at end portion 88. The seal 54 is fixed within the rectangular-shaped cross sectional area defined by the pocket sidewall, the outer diameter of portion 68, the shelf surface 62 of the pocket, and the end surface 88 of the bonnet.

During initial assembly, the bonnet may be threaded to the valve body until a sufficient axial force is applied to effect a seal. At the same time, seal 56 will be compressed by axial movement of the bonnet relative to the retainer 58. Accordingly, the length of the cylindrical-shaped retainer 58 is controlled so that when seal 56 is compressed to its desired extent, seal 56 will also be compressed to an extent sufficient to provide sealing engagement with the valve stem. With the seals 54 and 56 compressed as described herein, the jam nut 64 may be threaded to the valve body and tightened to prevent inadvertent rotation of the bonnet relative to the valve body.

Over a period of time, the compressive force on the seals 54 and 56 will diminish due to inelasticity of the sealing material over a long period of time and/or loss of sealing material. Should a leak occur past either seal 54 or 56, or as part of a regularly scheduled maintenance program, jam nut 64 may be unthreaded and the bonnet 50 further threaded to the valve body, thus simultaneously compressing both seals 54 and 56. When the seals have been compressed to the desired extent, the position of the bonnet relative to the valve body may be fixed by retightening jam nut 64 to the valve body.

It is a particular feature of the present invention to provide a valve assembly utilizing components generally available for assembling a valve which does not have the features of the present invention. Accordingly, the valve stem, bonnet, and valve body (including the dimensions of the pocket for receiving the lower portion of the bonnet) are similarly or identical to components utilized for a valve with a metal-to-metal seal between the bonnet and the valve body. The narrow annular gap between the bonnet and the stem for receiving seal 56 is thus conventional for valves of this type. Further details regarding these standard components may be found in U.S. Pat. No. 4,556,196, hereby incorporated by reference.

It should thus be understood that the concepts of the present invention are well adapted for various types of valves, including gate valves, ball valves, plug valves, control valves, safety valves, check valves, relief valves, and regulator valves, whether manually or power controlled. Also, the concepts of the present invention are well adapted for a valve with both the rotatable and axially movable valve stem described herein, or the invention can also be used in a valve having a valve stem which is rotatable but axially fixed, or a valve with a valve stem which is axially movable but not rotatable. The concepts of the present invention are also applicable to valves intended for use with any number of fluids, including liquids, gases, and mixtures of liquids and gases.

It is, however, a particular feature of the present invention to provide a valve with the valve stem seal and bonnet-valve body seal as described herein in a valve assembly of the type having a bonnet threadably affixed to the valve body, with the valve stem threaded and thus both rotatable and axially movable relative to the bonnet. As shown in FIGS. 1 and 2, the valve stem seal is provided between the valve stem sealing surface 40, 72 and the threads 76 on the valve stem. Even when the valve is in the fully open position, the valve stem sealing surface will remain below the valve stem seal, so that actuation of the valve will not interfere with the sealing function of the valve stem seal.

The valve of the present invention thus utilizes seals which are compressible or "packable", meaning that the desired sealing function is substantially if not totally independent of fluid pressure in the valve, and that the seal is made effective by an axially directed force or packing force applied to the seal in an amount sufficient to obtain the desired sealing function.

The design of the valve as described herein enables the valve to be easily manufactured so that fluid will not escape from the valve when in the fully open position even if the valve stem seal is lost due, for example, to fire or other unanticipated causes. When the valve is the fully open position, the conical surface 80 on the valve stem will provide a metal-to-metal seat with surface 78 on the bonnet, thus both indicating to the operator that the valve has achieved the fully open position and providing the desired metal-to-metal seal to prevent fluid leakage past the valve stem should the seal 56 fail.

The valve of the present invention is capable of handling various fluids for a long period of time and operating over a wide range of temperatures and pressures. It is a particular feature of the present invention that both the valve stem seal and the bonnet-body seal may be easily changed depending on the fluid, temperature, and pressure range anticipated. Since both of these components are ring-shaped in configuration, the seals may be manufactured at a nominal cost. If, for example, a high temperature valve is desired, the seals 54 and 56 may be fabricated from a compressible sintered ash material, such as Grafoil TM, which provides an effective seal for temperatures in excess of 1500° F. An effective lower temperature valve can be manufactured from the same components, with the seals 54 and 56 being fabricated from Teflon TM. With the exception of the soft seat 42 in the valve body, each of the other components discussed herein may be fabricated from any number of conventional materials, such as metals. Seals 54 and 56 may be fabricated from other available plastic or synthetic materials, such as Ryton TM, PEEK TM, or nylon.

It should be understood that various modifications may be made to the present invention without parting from the spirit and scope of the present invention. For instance, the bonnet may be bolted or otherwise fixed to the valve body in a manner which enables the bonnet to selectively be axially positionable relative to the valve body for compressing the seals. Means other than a jam nut may be provided for preventing inadvertent axial movement of the bonnet relative to the valve body. Accordingly, it should be understood that the methods and apparatus described herein and shown in the accompanying drawings are intended as exemplary embodiments of the invention, and not as limitations thereto.

What is claimed and desired to be secured by Letters Patent is:

1. A valve including a valve body having a fluid inlet, a fluid outlet, and a valve seat, a valve bonnet having a valve stem passageway in threaded engagement with said valve body, a valve stem having a central axis and movable relative to said bonnet, and a sealing surface on said valve stem for sealing engagement with said valve seat, the improvement comprising:
    a compressible valve stem seal between said bonnet and said stem for preventing loss of fluid past said valve stem;
    said valve stem including a threaded portion for threaded engagement with said valve bonnet for axially moving said sealing surface upon rotation of said stem, said threaded portion being positioned axially opposite said sealing surface with respect to said valve stem seal;
    a compressible valve bonnet-valve body seal between said bonnet and a pocket surface of said valve body for sealing between said bonnet and said valve body; and
    a retainer axially movable relative to said valve bonnet and in engagement with said valve body for compressing said valve stem seal upon rotational movement of said valve bonnet;
    whereby threaded rotation of said valve bonnet simultaneously sealingly compresses both said valve stem seal positioned between said valve bonnet and said retainer and said bonnet-valve body seal positioned between said valve body and said retainer.

2. Apparatus as defined in claim 1, further comprising:
    a jam nut for threated engagement with an exterior surface of said bonnet for engagement with said valve body for preventing inadvertent rotation of said bonnet relative to said valve body.

3. Apparatus as defined in claim 1, wherein said retainer includes an expanded diameter portion for engagement with said pocket surface of said valve body.

4. Apparatus as defined in claim 3, wherein said expanded diameter portion of said retainer engages said pocket surface only adjacent an interior diameter portion of said pocket surface.

5. Apparatus as defined in claim 1, wherein said bonnet-valve body seal is radially sandwiched between an outer diameter portion of said expanded diameter portion of said retainer and a cylindrical sidewall portion of said valve body pocket.

6. Apparatus as defined in claim 1, wherein said retainer is axially movable relative to said bonnet for at least a distance approximating the axial height of said bonnet-valve body seal.

7. Apparatus as defined in claim 1, wherein said bonnet-valve body seal is fabricated from a sintered ash material.

8. Apparatus as defined in claim 1, wherein said valve stem includes a tapered surface axially positioned between said threaded portion and said valve stem seal for sealing engagement with a mating surface of said valve bonnet when said valve is in a fully open position.

9. A valve including a valve body having a fluid inlet, a fluid outlet, and a valve seat, a valve bonnet having a valve stem passageway, a valve stem having a central axis and movable relative to said bonnet, and a sealing surface on said valve stem for engagement with said valve seat, the improvement comprising:
said bonnet being selectively axially positionable relative to said valve body;
a compressible valve stem seal between said bonnet and said valve stem for preventing loss of fluid past said valve stem;
a compressible valve bonnet-valve body seal between said bonnet and said valve body for sealing between said bonnet and said valve body; and
a retainer axially movable relative to said valve bonnet and in engagement with said valve body for compressing said valve stem seal upon movement of said valve bonnet;
whereby selective axial movement of said bonnet relative to said valve body simultaneously sealingly compresses both said valve stem seal positioned between said valve bonnet and said retainer and said bonnet-valve body seal positioned between said valve body and said retainer.

10. Apparatus as defined in claim 9, further comprising:
a jam nut for threaded engagement with an exterior surface of said bonnet for engagement with said valve body for preventing inadvertent rotation of said bonnet relative to said valve body.

11. Apparatus as defined in claim 9, wherein said retainer includes an expanded diameter portion for engagement with a pocket surface of said valve body; and
wherein said expanded diameter portion of said retainer engages said pocket surface only adjacent an interior diameter portion of said pocket surface.

12. Apparatus as defined in claim 11, wherein said bonnet-valve body seal is radially sandwiched between an outer diameter portion of said expanded diameter portion of said retainer and a cylindrical sidewall portion of said valve body pocket.

13. Apparatus as defined in claim 9, wherein said retainer is axially movable relative to said bonnet for at least a distance approximating the axial height of said bonnet-valve body seal.

14. Apparatus as defined in claim 9, wherein a lower portion of said bonnet is threaded for engagement with said valve body, and exterior surfaces of said bonnet are adapted for facilitating rotation of said bonnet relative to said valve body.

15. A method of sealing fluid within a valve of a type including a valve body having a fluid inlet and a fluid outlet, a valve seat, a valve bonnet for removable engagement with said valve body, a valve stem having a central axis movable relative to said bonnet, and sealing surface on said valve stem for sealing engagement with said valve seat, the method comprising:
providing a first compressible seal between said bonnet and said valve body for sealing between said bonnet and said valve body;
providing a second compressible seal between an end surface of said valve bonnet and said valve body;
providing a retainer axially positioned relative to said valve bonnet and in engagement with said valve body upon movement of said valve bonnet; and
selectively axially moving said bonnet relative to said valve body and thereby simultaneously sealingly compressing both said first seal and said second seal.

16. The method as defined in claim 1, further comprising:
fixing the axial position of said bonnet relative to said valve body for preventing inadvertent axial movement of said bonnet relative to said valve body.

17. The method as defined in claim 15, further comprising:
providing a stop surface for limiting axial movement of said retainer relative to said bonnet, said axial movement distance being functionally related to the axial length of said second seal.

18. The method as defined in claim 15, further comprising:
radially sandwiching said second seal between said valve body and said retainer.

19. The method as defined in claim 18, further comprising:
engaging only an edge portion of said retainer with an edge portion of said valve body.

20. The method as defined in claim 18, further comprising:
providing threads on said valve stem for threaded engagement with said bonnet; and
positioning said first seal between said valve stem sealing surface and said valve stem threads.

* * * * *